Oct. 6, 1953                J. A. PHINNEY                2,654,665
                    GASIFICATION OF CARBONACEOUS SOLIDS
                           Filed Feb. 21, 1950
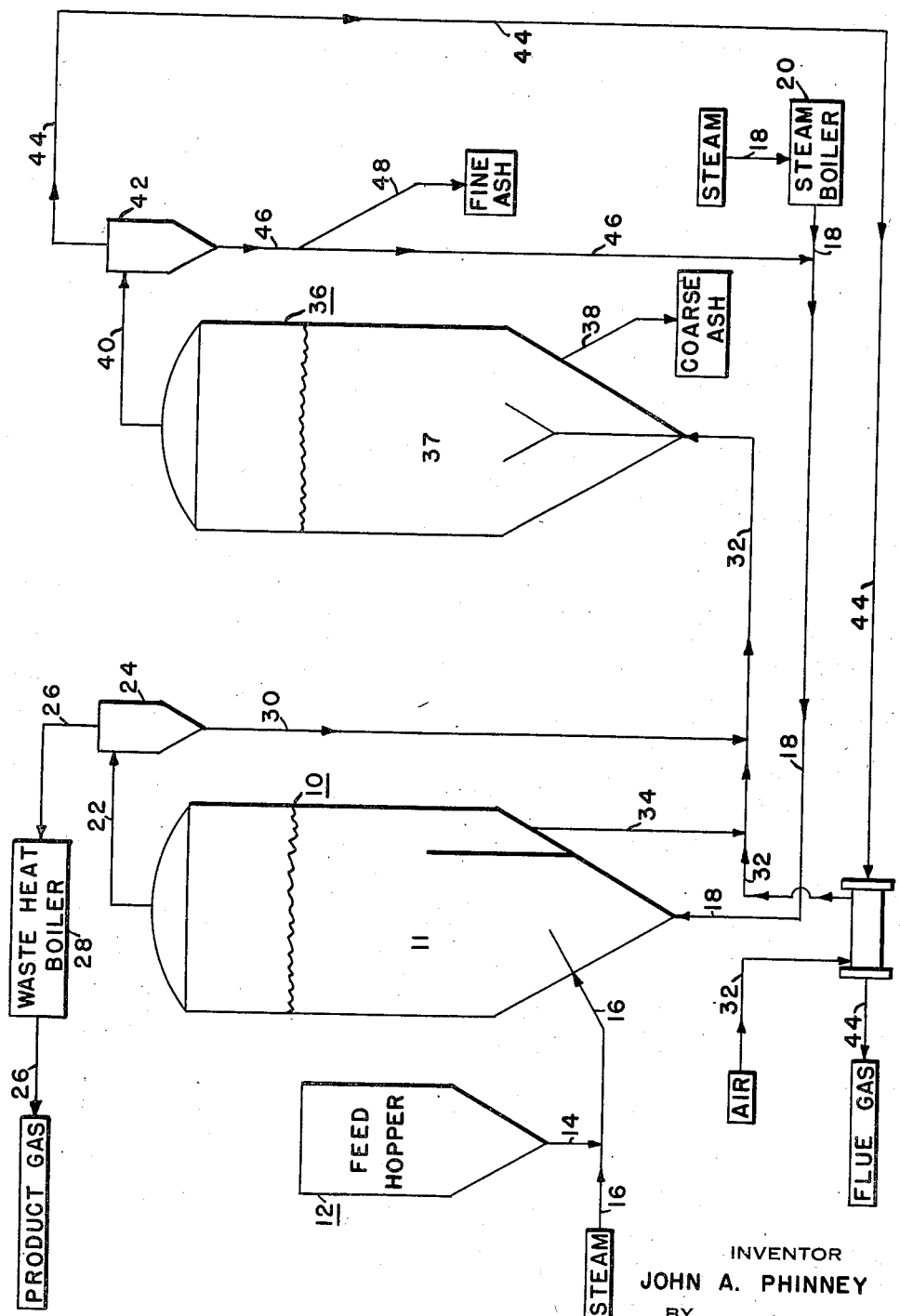
INVENTOR
JOHN A. PHINNEY
BY
D. Leigh Fowler, Jr.
ATTORNEY Patented Oct. 6, 1953

2,654,665

UNITED STATES PATENT OFFICE 2,654,665

GASIFICATION OF CARBONACEOUS SOLIDS

John A. Phinney, Mount Lebanon, Pa., assignor to Pittsburgh Consolidation Coal Company, Pittsburgh, Pa., a corporation of Pennsylvania Application February 21, 1950, Serial No. 145,374

1 Claim. (Cl. 48—206)

This invention relates to the gasification of carbonaceous solids and, more particularly, to the conversion of finely divided carbonaceous solid fuels to carbon monoxide and hydrogen in a fluidized steam-carbon reaction zone.

Operation of gasification systems employing a fluidized bed of carbon through which steam is passed at reaction temperature has demonstrated a very high rate of entrainment of solid fines in the effluent gases from the fluidized bed. As high as 1600 pounds of fines per hour per square foot of reactor cross-section (or 300 pounds per 1000 cubic feet of reactor effluent gas) have been observed. These entrained fines have been recirculated through the fluidized bed in an attempt to gasify them. However, such recirculation does not appreciably influence the analysis of the fluidized material remaining in the dense phase, thus demonstrating that the fines are not retained in the bed and accordingly not gasified.

The primary object of this invention is to provide a fluidized system for gasifying finely divided carbonaceous solid fuels wherein the carbon fed to the system is substantially completely gasified.

In accordance with my invention, the solid fines entrained by the effluent gases from a fluidized steam-carbon reaction zone are conducted, along with coarser solids withdrawn directly from the fluidized bed, to a fluidized combustion zone. Here the solids are completely burned, and the coarse ash is rejected from the system. At least a portion of the hot fine sized ash entrained in the effluent flue gases from the combustion zone is recirculated through the steam-carbon reaction zone to supply the necessary heat thereto by direct heat exchange with the solids in the fluidized bed. The particle size of the recirculated ash is regulated to insure its entrainment by the fluidizing gas in the steam-carbon reaction zone. Thus heating of the latter zone is accomplished without build-up of the ash content. By means of this system, it is possible to completely consume the carbon fed to the gasification system, thereby eliminating the problems associated with ungasified fines and high ash bed solids.

For a better understanding of my invention, its objects and advantages, reference should be had to the following detailed description and to the attached drawing in which is illustrated, partly diagrammatically and partly in section, a preferred embodiment of my invention.

Referring specifically to the drawing for a description of the apparatus in which the preferred embodiment is practiced and also its operation, numeral 10 designates a steam-carbon reaction vessel adapted to confine a fluidized bed of carbon 11. Finely divided carbonaceous solid fuel from a hopper 12 is fed through a conduit 14 into a conduit 16 through which sufficient steam is circulated to pick up the fuel and carry it into the vessel 10. The balance of the steam required for reaction with the carbon is supplied through a conduit 18 which communicates with the bottom of vessel 10. Heat is provided for the steam-carbon reaction in a manner to be described later. However, if desired, the steam may be preheated before introduction in vessel 10 by a boiler 20 arranged in heat exchange with conduit 18.

The size of the fuel particles and the superficial velocity of the total steam are selected to give fluidizing conditions in a manner well known in the art. However, the solid particles consist of a wide range of sizes as is generally produced upon once through grinding of the fuel to a finely divided state. Consequently, the gas velocity required to properly fluidize the coarser particles is sufficiently high to produce entrainment of the smaller particles.

The effluent gases and entrained solid fines are discharged overhead from vessel 10 through a conduit 22 to a cyclone separator 24. The product gas is recovered through conduit 26 and its sensible heat transferred, if desired, to a waste heat boiler 28. The fines are dropped from the separator through a conduit 30 to a conduit 32 and picked up by a stream of air circulating therethrough. At the same time, coarse solids from the fluidized bed 11 in vessel 10 are withdrawn through a draw-off line 34 and fed into the same air conduit 32 for admixture with the overhead fines. This mixture of solids is conducted to a combustion vessel 36 wherein a fluidized bed 37 of the solids is maintained by the air. Because of the rapid rate of reaction of carbon and oxygen, a substantial portion or all of the combustion of the solids will occur in the line 32. The superficial velocity of the air through vessel 36 is so chosen that the particle size of the ash entrained in the effluent gases is small enough to insure entrainment in vessel 10. Coarse ash is discharged from the bed in vessel 36 through a draw-off conduit 38. For example, for a range of particle size in bed 11 in vessel 10 of between 35 and 200 mesh and a fluidizing gas velocity of 1.0 foot per second, the fluidizing gas velocity in vessel 36 should be 0.7 or if the fluidizing velocity in vessel 10 is 2.0 feet/second the fluidizing gas velocity in vessel 36 should be 1.7 feet/second.

The effluent flue gases and entrained ash are discharged overhead from vessel 36 through a conduit 40 to a cyclone separator 42. The hot solid free gas is then conveyed through a conduit 44 in heat exchange relation with the air line 32 to preheat the air. The fine ash particles are dropped through a conduit 46 to the steam line 18. Net fine ash is rejected from the system through a draw-off conduit 48.

The fine ash is picked up by steam in conduit 18, and recirculated to the fluidized bed 11 in vessel 10. The amount of ash recirculated is regulated to supply the heat required to maintain the endothermic steam-carbon reaction in vessel 10. As previously indicated, the particle size of the recirculated ash is such that its entrainment in the effluent gases in vessel 10 is assured. Thus, while the ash furnished the heat required, it does not alter the analysis of the material in the bed in vessel 10 by build-up of ash.

In the preferred embodiment described above, the particle size of the recirculated fine ash is controlled to insure its entrainment in the fluidizing gases in the gasification vessel by regulating the superficial velocity of the oxidizing gas in the combustion zone. The same result may be secured by substituting a suitably designed cyclone for vessel 37 in the combustion zone to reject particles which are too large for recirculation to vessel 11. The desired finer particles are thereafter separated in cyclone 42.

The following example is given by way of illustration only. A carbonaceous solid fuel of the following typical screen analysis for fluidization is fed to the gasification zone operating at 1700° F.

Fraction retained on weight per cent:

| | |
|---|---|
| 35 mesh | 0.1 |
| 65 mesh | 6.9 |
| 100 mesh | 11.0 |
| 200 mesh | 32.0 |
| 325 mesh | 17.0 |
| Pan | 33.0 |
| | 100.0 |

The carbon and ash contents of this feed are 78.3 and 13.4 weight percent respectively. For every 100 pounds of fresh feed, 4050 pounds of fine ash from the combustion zone operating at 1950° F. are also fed to the gasifier, entrained in 180 pounds of steam previously preheated to 1400° F. by heat exchange. With an exit gas velocity of about 1.5 feet/second, the recirculated ash fines are immediately entrained from the fluid bed, together with the majority of the fresh feed solids of a size consist finer than 200 mesh (ca 25 pounds/100 pounds of fresh feed). The ash content of the fluid bed is dictated only by the entrained coarser particles, and in this example is maintained at about 75% by proper balance of feed rate and steam carbon reaction rate through proper control of reaction temperature, bed inventory, and steam conversion.

The entrained ash fines together with net fines from the fresh feed are collected at reaction temperature in the cyclone separator and recycled to the combustion zone by entrainment in preheated combustion air. The average carbon content of this stream is about 0.5-2.0%. Product gases pass to subsequent heat exchange and cooling equipment. The coarser particles, constituting the net reject from the gasification vessel fluid bed and containing 25% carbon, are also carried to the combustion zone in combustion air. Combustion of the carbon in both the net fines and the ash reject from the gasification zone (13 pounds/100 pounds feed) raised the average temperature in the combustion zone to 1950° F. Separation of the coarse and fine ash is accomplished by either entrainment or cyclonic action, while final separation of fines from flue gas is carried out at 1950° F. in subsequent cyclones. Net coarse ash and net fine ash are rejected from the system, the remaining fine ash being recycled to the gasification section as described above.

According to the provisions of the patent statutes, I have explained the principle, preferred construction, and mode of operation of my invention and have illustrated and described what I now consider to represent its best embodiment. However, I desire to have it understood that, within the scope of the appended claim, the invention may be practiced otherwise than as specifically illustrated and described.

I claim:

The method of gasifying finely divided carbonaceous solid fuel which comprises continuously supplying finely divided carbonaceous solid fuel of different particle sizes to a confined gasification zone to thereby establish and maintain a bed of solids in said zone, passing steam upwardly through said bed at a velocity sufficient to maintain the solids as a suspended dense turbulent phase superimposed by a dilute solids phase in said gasification zone, continuously supplying hot substantially carbon-free ash fines derived from said fuel to said gasification zone, passing said ash fines upwardly through said dense phase in said gasification zone and into said dilute phase, the particle size range of said ash fines being such that substantially all of said ash is carried into said dilute phase by the effluent gas from said dense phase, separating said ash fines and any entrained carbonaceous fines from said dilute phase, withdrawing solids having an average carbon content corresponding to that of said dense phase directly from said gasification zone and combining said solids with said separated fines outside of said gasification zone, passing said combined solids to a combustion zone, circulating an oxidizing gas in contact with said solids in said combustion zone under conditions such that the temperature of the combustion zone is maintained above that of said gasification zone and such that said solids are reduced to a substantially carbon-free state, separating from the ash produced in said combustion zone a portion having a particle size range corresponding to that of the first mentioned ash fines, recycling that portion only to said gasification zone, and recovering the gaseous products from said gasification zone.

JOHN A. PHINNEY.

References Cited in the file of this patent

UNITED STATES PATENTS

| Number | Name | Date |
|---|---|---|
| 2,429,127 | Graham et al. | Oct. 14, 1947 |
| 2,436,938 | Scharmann et al. | Mar. 2, 1948 |
| 2,482,187 | Johnson | Sept. 20, 1949 |
| 2,560,403 | Arveson | July 10, 1951 |

FOREIGN PATENTS

| Number | Country | Date |
|---|---|---|
| 600,326 | Great Britain | Apr. 6, 1948 |